United States Patent [19]

Kuwayama et al.

[11] Patent Number: 4,585,103

[45] Date of Patent: Apr. 29, 1986

[54] AUTOMATIC TRANSMISSION LOCKING MECHANISM FOR PARKING

[75] Inventors: Yoshinari Kuwayama; Masakatsu Miura, both of Anjo; Kunio Morisawa, Toyota, all of Japan

[73] Assignees: Aisin-Warner K.K., Anjo; Toyota Jidosha K.K., Toyota, both of Japan

[21] Appl. No.: 498,910

[22] Filed: May 27, 1983

[30] Foreign Application Priority Data

May 28, 1982 [JP] Japan .................................. 57-91724

[51] Int. Cl.$^4$ ............................................. B60K 41/26
[52] U.S. Cl. .................................................... 192/4 A
[58] Field of Search .............. 192/4 A, 4 R; 74/411.5, 74/710.5, 527, 99 A, 107, 569; 188/69, 31

[56] References Cited

U.S. PATENT DOCUMENTS 3,601,230 8/1971 Platz ........................................ 74/527
3,912,050 10/1975 Iwanaga et al. ...................... 192/4 A Primary Examiner—George H. Krizmanich Attorney, Agent, or Firm—Cooper, Dunham, Clark, Griffin & Moran

[57] ABSTRACT

An automatic transmission locking mechanism including a detent lever rotatively interlocked with a manual shift lever and provided with notches corresponding to the shift positions, respectively, of the manual shift lever for receiving the detent of a detent spring, a rod adapted to be advanced or retracted by the detent lever, a parking gear fixed to the output shaft of the automatic transmission, a pawl having a detent to be engaged with the parking gear in locking the parking gear, a cam slidably mounted on the rod and adapted to push the pawl for turning when the rod is advanced in shifting the manual shift lever to the parking position, a bracket on which the cam runs upward and a spring for releasing the pawl from the parking gear and for retaining the pawl at the released position. A contact surface formed in the free end of the pawl for engagement with the cam is formed so as to reduce the detrimental slip between the cam and the contact surface to the least possible degree.

3 Claims, 2 Drawing Figures

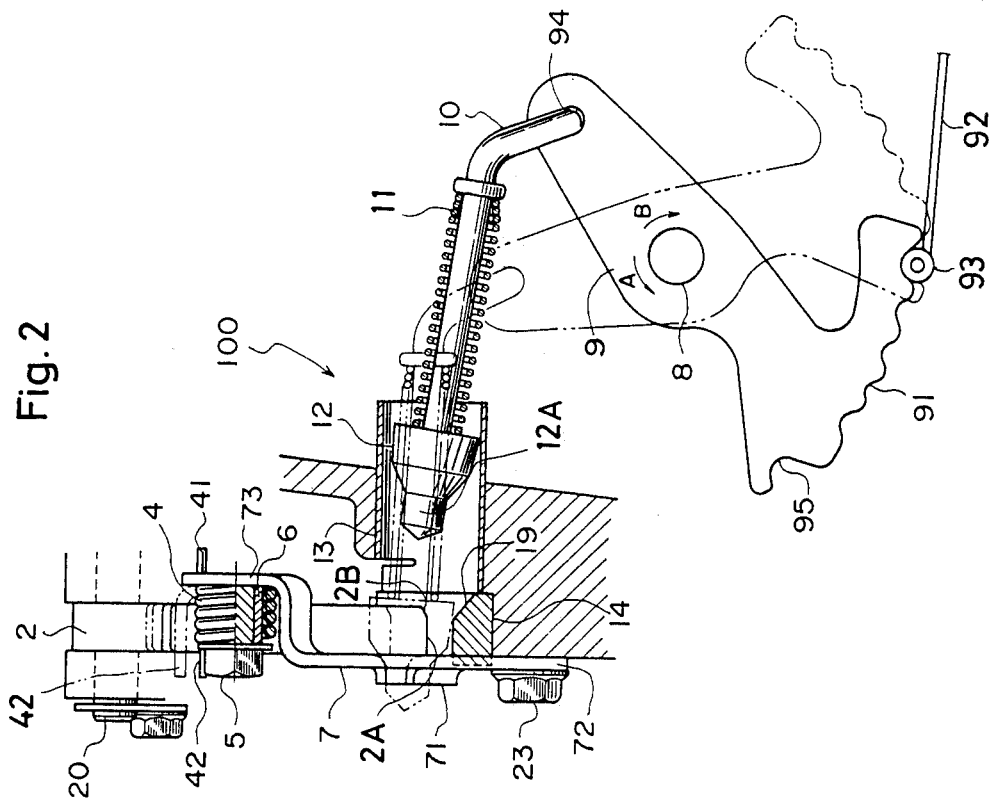
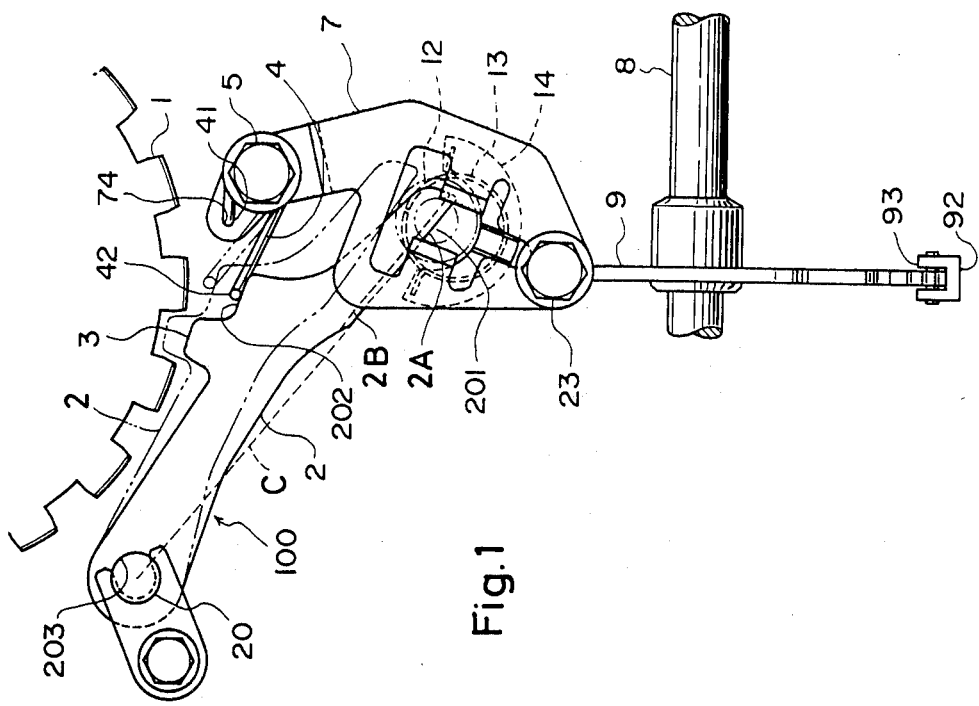

… … …

AUTOMATIC TRANSMISSION LOCKING MECHANISM FOR PARKING

BACKGROUND OF THE INVENTION

1. Field of the Invention

The present invention relates to an automatic transmission locking mechanism for an automatic transmission for a vehicle and more particularly to an automatic transmission locking mechanism for an automatic transmission of a reduced axial dimention for a vehicle.

2. Description of the Prior Art

In most front-engine front-drive automobiles (designated as "FF automobiles" hereinafter), the engine is mounted transversely. Accordingly, the axial dimension of an automatic transmission for an FF automobile is required to be reduced, particularly when the engine is mounted transversely.

Most conventional automatic transmission locking mechanisms interlocked with a manual shift lever employ the following constitution. That is, a lever is joined integrally to a manual shaft which is turned through the manual operation of a manual shift lever, the rear end of a cam rod provided intermediately with a cam is linked to the lever and the free end of a pole with a detent is pushed up and thereby the pawl is turned about the axis of turning thereof when the cam is caused to run on a slope formed in a bracket supporting the front portion of the cam rod extending forward from the cam, whereby the detent engages with a parking gear fixed to the output shaft of the transmission to lock the output shaft. A spring mechanism in included the automatic transmission locking mechanism to retain the pawl with the detent at the released position while the vehicle is running so that the detent will not be brought into contact with the parking gear while the vehicle is running.

When such an automatic transmission locking mechanism is applied to an automatic transmission for an FF automobile in which the manual shaft and the shaft provided with the parking gear are disposed remotely from each other and in distantly stepped planes, the distance between the center of turning and the cam engaging surface of the pawl with the detent is increased due to the distant relative disposition between those shafts and hence an increased relative slip in a direction perpendicular to the direction of advancement of the cam between the cam and the cam engaging surface occurs when the pawl with the detent is turned and thereby the movement of the cam is impeded and the wear of the cam is accelerated. Furthermore, such a constitution inevitably requires an elongate pawl with a detent, therefore, the weight of the pawl is increased and the pole is inclined, so that the movement of the cam is further impeded and the wear of the cam is further accelerated.

SUMMARY OF THE INVENTION

Accordingly, it is an object of the present invention to provide an automatic transmission locking mechanism designed to reduce to the least possible degree the slip in a direction perpendicular to the direction of advancement of the cam between the cam and the pawl with the detent when the cam pushes up the free end of the pawl with the detent and hence capable of eliminating the slip between the cam and the pawl with the detent which is detrimental to the operation of the automatic transmission locking mechanism and of reducing the wear of the cam.

An automatic transmission locking mechanism according to the present invention includes a lever interlocked with and adapted to be turned by a manual shift lever, a rod adapted to be advanced or retracted by the lever, a parking gear, a pawl having a detent which engages with a parking gear, a cam mounted on the rod and adapted to push up the free end of the pawl to turn the pole about its own center of turning in placing the automatic transmission in the parking position, a bracket on which the cam runs and a spring for releasing the detent from the parking gear and for retaining the pole at the released position, wherein the contact surface of the pawl which engages with the cam is formed of a plane which is normal to the axis of turning of the pawl and/or an inclined surface, curved surface so as to reduce, to the least possible degree, the relative slip in a direction perpendicular to the direction of advancement of the cam between the cam and the pawl.

Other object and the features of the present invention will become apparent from the following detailed description of the preferred embodiment thereof, taken in connection with the accompanying drawings.

BRIEF DESCRIPTION OF THE DRAWING

FIG. 1 is a front view of an automatic transmission locking mechanism according to the present invention, for facilitating the description of the operation thereof, and FIG. 2 is a side view of the automatic transmission locking mechanism of FIG. 1, for facilitating the description of the operation thereof.

DESCRIPTION OF THE PREFERRED EMBODIMENT

Referring to FIGS. 1 and 2, an automatic transmission locking mechanism 100 includes a detent lever 9, a rod 10, a cam 12, a sleeve 13, a bracket 14, a pole 2 having a detent, a torsion spring 4, a support plate 7 and a parking gear 1.

The detent lever 9 is a plate-shaped member fixed to a manual shaft 8 operatively interlocked with a manual shift lever, not shown, and adapted to be turned on the manual shaft. A plurality of notches 91 are formed in the circular edge of the detent lever 9 at positions corresponding to the shift positions (in this embodiment, six positions corresponding to parking, neutral, drive, 3rd and low shift positions) respectively. The free end 93 of a detent spring 92 engages with those notches 91 as the detent lever 9 is turned. The rear end of the rod 10 is rotatably fitted in a hole 94 formed in the detent lever 9 opposite to the circular edge having the notches 91. The rod 10 is pushed forward as the detent lever 9 is turned in the direction of the arrow A. The cam 12 is fitted on the rod 10 in the front portion thereof and is adapted to be biased with a coil spring 11 mounted round the rod 10, to form a cam rod. As the rod 10 is pushed forward, the spring 11 pushes the cam 12 forward along the rod 10. The cam 12 has a conical surface of a sharp conical angle and a conical surface of an obtuse conical angle each being tapered toward the front end of the rod 10. The cam 12 is guided by and advances within the tubular sleeve 13 as the detent lever 9 is turned in the direction of the arrow A and finally enters a case. Then, the cam 12 runs on a slope 19 formed in the semicircular bracket 14 fixed to the case with the plate 7 and bolts 5 and 23 are forced into a gap formed between the bracket 14 disposed in front of the sleeve 13 and the free end portion 201 of the pawl 2 having the detent 3, whereby the pawl 2 starts rising from a position indicated by continuous line. Upon the entrance of the free end 93 of the detent spring 92 into a notch 95 corresponding to the parking position of the manual shift lever, the cam 12 rides onto the top of the slope 19 of the bracket 14, whereby the pawl 2 is turned on its shaft to a position indicated by alternate long and two short dashes line.

The pawl 2 having the detent is a bar-shaped member of a predetermined curved form having a cam engaging surface 201 formed in the free end portion thereof for engagement with the cam 12, the detent 3 formed in the intermediate portion thereof, a seat 202 formed near the detent 3 on the side of the free end of the member with respect to the detent 3 for receiving one end of the torsion spring 4 and a hole 203 formed at the other end thereof for receiving a support shaft.

The cam engaging surface 201 consists of a plane 2A extending along the direction of a normal line intersection the center axis of a pawl shaft 20 fitted in the hole 203 to support the pawl 2 (the direction indicated by broken line C) and an inclined surface 2B, shaped parallel to said plane 2A, therefore, minute slip in a direction perpendicular to the direction of advancement of the cam 12 occurs between the cam 12 and the cam engaging surface 201, when the cam 12 pushes up the free end of the pawl 2.

When the cam 12 fully pushes up the free end of the pawl 2, the pawl 2 is turned on the pole shaft 20 fitted in the hole 203 perpendicularly to the direction of advancement of the cam 12 as far as the detent 3 is engaged with the parking gear 1 to lock the automatic transmission. A hole 71 for receiving the front part 12A of the cam 12 when the manual shift lever is shifted to the parking range is formed in alignment with the extension of the center axis of the semicircular bracket 14 in the central part of the plate 7. The plate 7 is fastened at one part (lower part in the drawing) 72 and at the other part (upper part in the drawing) 73 to the case with the bolts 23 and 5 respectively. The upper part 73 of the plate 7 is formed in a crank-shape. The torsion spring 4 is mounted round a space 6 fitted on the projecting part of the bolt 5 fastening the crank-shaped upper part 73 of the plate to the case, so as to be disposed within a plate in which the pawl 2 turns, with one end 41 thereof engaged with a finished hole 74 formed in the plate, namely, a finished hole formed in a finished part, and with the other end 42 thereof engaged with the seat 202 formed in the pawl 2 nearby the detent 3 to bias the free end 201 of the pawl 2 toward the bracket 14.

The operation of the automatic transmission locking mechanism for locking or releasing the parking gear will be described in detail hereunder.

When the detent lever 9 is turned manually in the direction of the arrow A as far as the free end 93 of the detent spring engages with the parking range notch 95, the cam 12 rides on top of the bracket 14 to push the free end of the pole 2 so as to cause the detent 3 of the pawl 2 to engage with the parking gear 1. However, since the mechanism is designed not to allow the detent 3 to engage with the parking gear 1 while the parking gear 1 is turning at a revolving rate over a predetermined revolving rate, the pawl 2 is caused to oscillate on the support shaft 20 by the axial vibration of the cam 12 due to the composite effect of the resilience of the torsion spring 4 rotatably biasing the pawl 2 away from the parking gear 1 and the resilience of the coil spring 11 biasing the pawl 2 through the cam 12 toward the parking gear 1. After the revolving rate of the parking gear 1 has been reduced below the predetermined revolving rate, the detent 3 of the pawl 2 is caused to engage with the parking gear 1 by the balance of the force applied to the pole 2 by the torsion spring 4 to bias the pawl 2 away from the parking gear 1 and the force applied to the pawl 2 by the coil spring to bias the pole toward the parking gear 1, which is greater than the former.

When the detent lever 9 is turned in the direction of the arrow B, while the detent 3 is engaged with the parking gear 1, the resilience of the coil spring 11 becomes insufficient to keep the detent 3 engaged with the parking gear 1 and thereby the pawl 2 is moved away from the parking gear 1 by the effect of the torsion spring 4.

As described hereinbefore, since only minute slip in a direction perpendicular to the direction of movement of the cam 12 occurs between the cam 12 and the cam engaging surface 201 of the pawl 2, when the cam 12 pushes up the free end of the pawl 2, the wear of the cam 12 resulting from the axial vibration of the cam 12 and the oscillation of the pawl 2 is reduced. After the cam has left the sleeve 13, the plate 7 supports the cam 12.

As described hereinbefore, the automatic transmission locking mechanism according to the present invention includes the detent lever rotatively interlocked with the manual shift lever, the rod adapted to be advanced or retracted by the detent lever, the parking gear, the pole having the detent to be engaged with the parking gear, the cam mounted on the rod and adapted to push the pawl for turning in shifting the manual shift lever to the parking position, the bracket on which the cam runs and the spring for releasing the pawl from the parking gear and for retaining the pawl at the released position, wherein the contact surface formed in the pawl for engagement with the cam consists of a plane extending along a normal line to the axis of rotation of the pawl and/or an inclined surface, curved surface so as to reduce, to the least possible degree, the relative slip in a direction perpendicular to the direction of advancement of the cam between the cam and the pawl. Therefore, the automatic transmission locking mechanism of the present invention is capable of eliminating slip between the cam and the pawl, which is detrimental to the operation of the mechanism, to attain smooth relative movement between the cam and the pawl and of reducing the wear of the cam.

We claim:

1. A parking lock mechanism for an automatic transmission comprising:
   (a) a parking gear having teeth at its periphery and rotatably mounted on an output shaft;
   (b) a pawl having a detent, pivotably mounted between a locking position in which the pawl is brought toward and into mesh with said parking gear through said detent and a releasing position in which the pawl is brought away and out of mesh from said parking gear through said detent;
   (c) a spring continuously exerting a force biasing said pawl toward the releasing position;
   (d) a rod mounted so as to be axially advanced, retracted and vibrated in a direction perpendicular to a plane in which said pawl pivots;
   (e) a cam having an inclined surface at one end and secured to said rod at its other end, said inclined surface adapted to slidably push said pawl to pivot it toward the locking position against the force of said spring as the rod is axially advanced and allow said pawl to pivot back toward the releasing position by the force of said spring as the rod is axially retracted; and (f) said pawl having a cam engaging surface for engagement with said cam, the cam engaging surface is adapted so that the axial vibration of the cam and the oscillation of the pawl is on a plane extending along a normal line to the axis of rotation of the pawl and the inclined surface of the cam so as to reduce, to the least possible degree, the relative slip in a direction perpendicular to the direction of advancement of the cam between the pawl and the cam, to attain smooth relative movement between the cam and the pawl and thereby reduce the wear of the cam.

2. A parking lock mechanism for an automatic transmission as recited in claim 1, wherein a bracket is provided to guide said cam so as to slidably push against said pawl in the direction normal to the axis of rotation of the pawl.

3. A parking lock mechanism for an automatic transmission as recited in claim 1, said spring being a torsion coil spring positioned within the plane in which said pawl pivots, and secured at one end to a stationary member and at the other end to the pawl to exert a force continuously biasing the pawl toward the releasing position.

* * * * *